Dec. 31, 1940.   A. GARBACZ   2,226,853
ENDLESS CHAIN CONVEYER
Filed Jan. 27, 1939   2 Sheets-Sheet 1
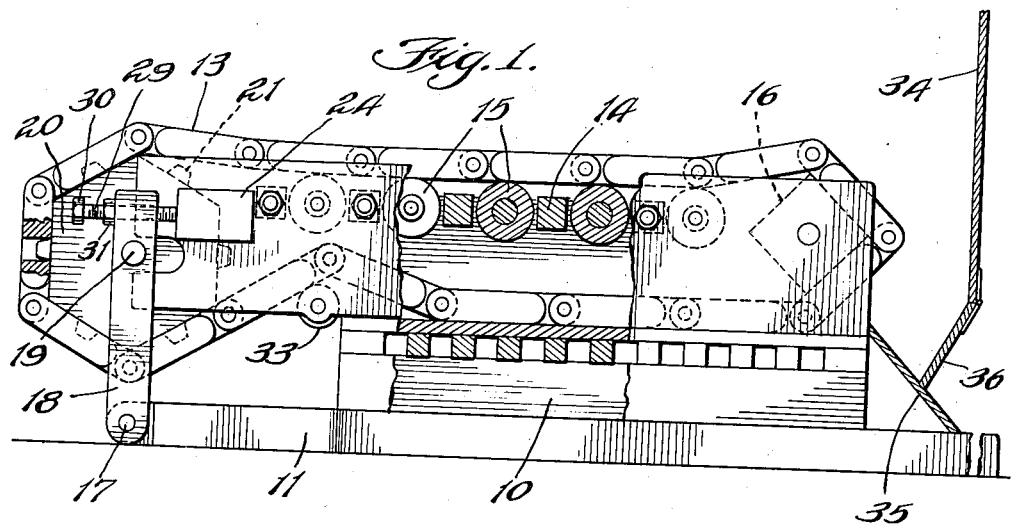
INVENTOR.
Albert Garbacz
BY
ATTORNEY.

Dec. 31, 1940.  A. GARBACZ  2,226,853
ENDLESS CHAIN CONVEYER
Filed Jan. 27, 1939  2 Sheets-Sheet 2

INVENTOR.
Albert Garbacz
BY
ATTORNEY.

Patented Dec. 31, 1940

2,226,853

UNITED STATES PATENT OFFICE 2,226,853

ENDLESS CHAIN CONVEYER

Albert Garbacz, Harvey, Ill.

Application January 27, 1939, Serial No. 253,130

3 Claims. (Cl. 198—208)

The present invention relates to endless chain conveyers and has a particular application to conveyers used in connection with furnaces to convey thereinto iron ingots, castings, etc.

Endless chain conveyer, when in use in varying temperatures, necessarily contracts or expands, and therefore a further object of the present invention is the provision of means in an endless chain conveyer whereby the distances between two supporting pulleys may be varied so as to eliminate the slack in the endless chain conveyer superinduced therein due to the expansion thereof when under high temperature.

A still further object of the present invention is the provision in combination with the mechanism for taking up the slack in the endless chain conveyer due to the expansion thereof when under the influence of high temperature, of means for automatically bringing the supporting pulleys to the necessary adjusted distances when the chain contracts due to the influence of a reduced temperature.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views;

Fig. 1 is a side elevational view partly in section of the present device;

Fig. 2 is a top elevational view of the present invention;

Figure 3:
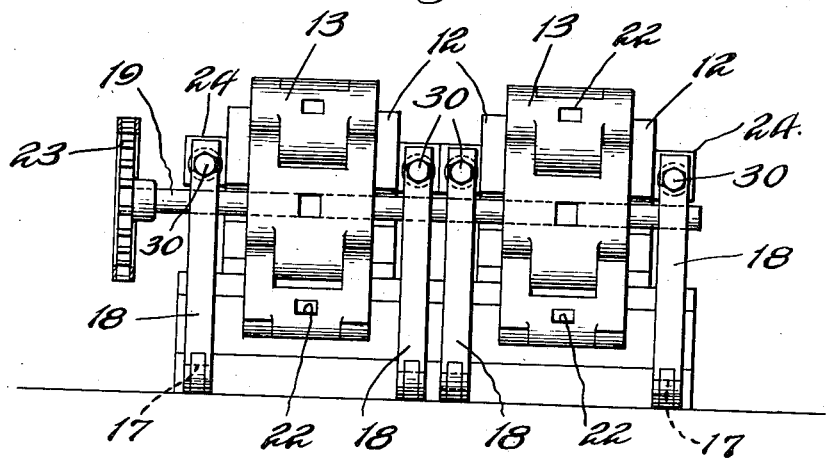
Fig. 3 is the front elevational view of the invention.

Referring in detail to the present drawings there is shown an endless chain conveyer, which includes base 10, supported by the lateral base bars 11. Supported upon said base 10 is a frame structure, including spaced side walls 12 within which endless chain 13 is adapted for longitudinal movement.

Adjacent the upper edges of said side walls 12, a plurality of brace bars 14 are positioned for the purpose of maintaining said side walls 12 in a rigid relative position. Interposed in an alternate relation between said brace bars 14 is a plurality of rollers 15 for supporting the upper section of the endless chain 13 as the same slides thereon while in operation.

Positioned within said side walls 12 and adjacent the rearward end thereof is one supporting pulley 16, which may be polygonal or round in shape, and which may have a plurality of teeth to engage the links of the endless chain 13.

Pivotally affixed to each pair of base bars 11 as at 17 is a pair of upwardly projecting arms 18 within upper ends of which shaft 19 is journaled. Rigidly affixed to said shaft 19 is the front chain supporting pulley 20 which may be of polygonal or round formation with a plurality of teeth 21 made on the periphery thereof to engage slots 22 made in the links of the endless chain 13. Affixed to one end of said shaft 19 is a wheel and chain 23 through which motive power to shaft 19 is transmitted.

Affixed to the outer faces of each pair of adjacent side walls 12 are boxes 24 which may be of round or square formation on transverse cross-section. Each of said boxes 24 has its front end open to receive therethrough block 25 for longitudinal shifting movement therewithin. The front end of said block 25 has a concentric depression 26 for the purposes hereinafter described. The rear or inner end of said block 25 is provided with a reduced end 27 adapted to be engaged by a coil spring 28 which is adapted to bear against said block 25 by one of its ends and against the rear wall of box 24 by its opposite end as is clearly seen in Fig. 4.

The upper end of each arm 18 is adapted to receive screw 29 provided with head 30 and an adjusting nut 31. The inner end of screw 29 is adapted for positioning within said depression 26 and for bearing against block 25.

Said shaft 19 is journaled within several arms 18 at points below screws 29. So that said shaft 19 may clear side walls 12, clearance slots 32 adjacent the front end of walls 12 are provided.

A lower supporting roller 33 set within each pair of side walls 12 and adjacent the lower edges thereof, and near the front termination of base 10, is provided to contact with lower portion of endless chain 13 for supporting the same.

From the hereinabove description it will be seen that arms 18 are adapted for angular shifting movement upon their pivots 17. Assuming that endless chain conveyer 13 is slack due to its expansion when under high temperature, screws 29, by engaging their heads 30 by a suitable tool such as wrench, may then be driven toward block 25, and when this adjustment is made in connection with each adjacent pair of arms 18, each pair of arms 18 will then assume the position illustrated by dotted lines in Fig. 4. This operation of arms 18 will carry with them shaft 19 away from the front adjacent ends of side walls 12, and with it the front pulley 20 will likewise be carried. Thus, pulley 20 will become shifted away from pulley 16 for the purpose of extending endless chain 13 and thereby all slack in said chain will be taken up. This operation is predicated upon the assumption that each spring 28 is sufficiently strong to maintain arms 18 in an angularly adjusted position shown by dotted lines in Fig. 4 to overcome any tendency thereof to shift into an opposite direction due to pressure of chain 13 when the same remains in a taut adjusted position and thereby bearing against pulley 20.

Figure 4:
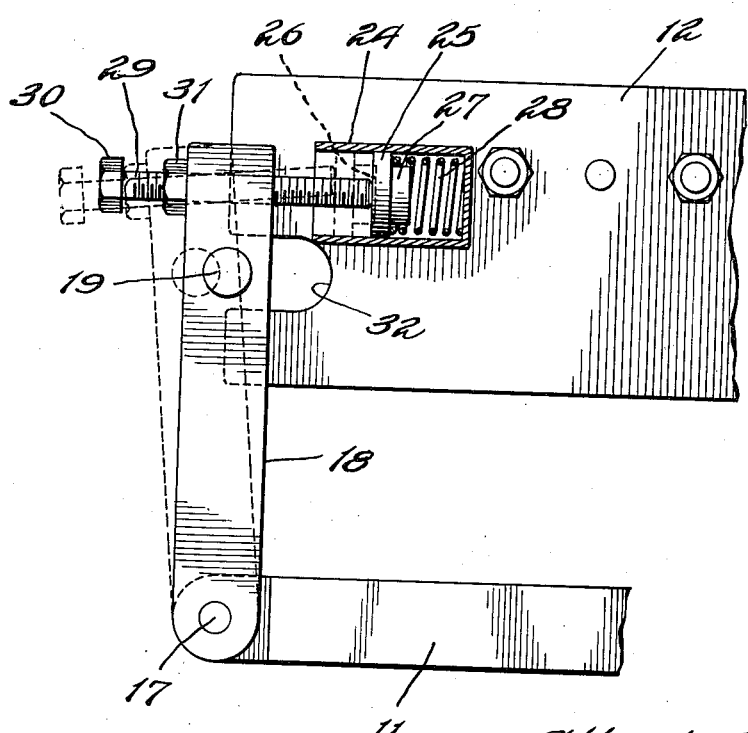
Fig. 4 is an enlarged side elevational view of the front end of the invention.

Assuming that arms 18 remain in an adjusted position as shown by dotted lines in Fig. 4, the temperature in the furnace is reduced and thereby the pulley links contract. In such an instant the pressure of the conveyer chain 13 will be sufficiently strong to overcome the tension of springs 28 and bring arms 18 into the position shown in full lines in Fig. 4. This operation of arms 18 will necessarily cause screws 29 to exert sufficient pressure upon block 25 to overcome the tension therein by springs 28, and will cause the depression of springs 28 as is shown in full lines in Fig. 4.

Referring to Figs. 1 and 2 there is shown therein wall 34 which may be the rear wall of the furnace or a portion of the rear door thereof, and spaced from the rear end of the conveyer. An inclined wall 35 is supported upon base bars 11, with a trap door 36 angularly disposed with relation thereto, said trap door being hingedly connected to wall 34. Any articles, after they have passed through the heating brushes while remaining on the conveyer chain 13 may then be conveyed by it until they drop to the inclined wall 35 and therefrom slide down and through trap door 36 to fall beyond wall 34. It is assumed that the weight of the falling objects from the chain conveyer 13 as the same moves rearwardly will be sufficient to open trap door 36.

While there is described herein a preferred embodiment of the present invention, it is nevertheless to be understood that minor changes may be made therein without departing from the spirit and scope of the invention as claimed.

What I claim as new is:

1. In an endless chain conveyer, laterally spaced longitudinal supporting bars, a base disposed on and supported by said bars, a frame structure supported upon said base and including spaced side walls having clearance slots in corresponding ends thereof, a transverse horizontal shaft journaled in the other ends of said side walls, a pulley fixed on said shaft between said side walls, a pair of arms pivoted to and rising from the ends of said supporting bars remote from said pulley and disposed at the outer sides of said side walls, a second transverse horizontal shaft journaled in said arms adjacent the upper ends of the latter and movable in said clearance slots, a further pulley fixed on the second-named shaft between said arms, an endless conveyer chain passing around said pulleys, and yieldable means acting to swing said arms away from the first-named pulley to maintain said conveyer chain taut as it expands or contracts due to temperature changes.

2. In an endless chain conveyer, laterally spaced longitudinal supporting bars, a base disposed on and supported by said bars, a frame structure supported upon said base and including spaced side walls having clearance slots in corresponding ends thereof, a transverse horizontal shaft journaled in the other ends of said side walls, a pulley fixed on said shaft between said side walls, a pair of arms pivoted to and rising from the ends of said supporting bars remote from said pulley and disposed at the outer sides of said side walls, a second transverse horizontal shaft journaled in said arms adjacent the upper ends of the latter and movable in said clearance slots, a further pulley fixed on the second-named shaft between said arms, an endless conveyer chain passing around said pulleys, yieldable means acting to swing said arms away from the first-named pulley to maintain said conveyer chain taut as it expands or contracts due to temperature changes, said yieldable means including boxes fixed on the outer sides of said side walls and having spring-pressed blocks therein yieldingly urged toward said arms, and screws adjustably threaded through the upper ends of said arms and impinging said blocks.

3. In an endless chain conveyer, laterally spaced longitudinal supporting bars, a base disposed on and supported by said bars, a frame structure supported upon said base and including spaced side walls having clearance slots in corresponding ends thereof, a transverse horizontal shaft journaled in the outer ends of said side walls, a pulley fixed on said shaft between said side walls, a pair of arms pivoted to and rising from the ends of said supporting bars remote from said pulley and disposed at the outer sides of said side walls, a second transverse horizontal shaft journaled in said arms adjacent the upper ends of the latter and movable in said clearance slots, a further pulley fixed on the second-named shaft between said arms, an endless conveyer chain passing around said pulleys, and yieldable means acting to swing said arms away from the first-named pulley to maintain said conveyer chain taut as it expands or contracts due to temperature changes, spaced transverse brace bars connected to said side walls at the upper edges of the latter, and transverse idler rollers journaled between said brace bars for supporting the upper flight of said conveyer chain.

ALBERT GARBACZ.